United States Patent [19]

Chuan

[11] 3,715,911
[45] Feb. 13, 1973

[54] APPARATUS FOR SENSING AIR-BORNE PARTICULATE MATTER

[75] Inventor: Raymond L. Chuan, Altadena, Calif.

[73] Assignee: The Susquehanna Corporation

[22] Filed: May 11, 1970

[21] Appl. No.: 36,222

[52] U.S. Cl...................73/28, 73/23, 324/71 CP, 340/237 R
[51] Int. Cl..................G01n 15/02, G08b 21/00
[58] Field of Search......73/23, 28, 170 R, 432 R, 432 PS, 73/24–27, 29; 340/236, 237 R, 237 S, 421; 324/71 CP, 71 R; 260/413

[56] References Cited

UNITED STATES PATENTS

| 3,561,253 | 2/1971 | Dorman | 73/28 |
|---|---|---|---|
| 1,274,415 | 8/1918 | Hill | 73/28 |
| 2,076,553 | 4/1937 | Drinker | 73/28 X |
| 2,947,164 | 8/1960 | Orr | 73/28 |
| 3,092,583 | 6/1963 | Wolff | 73/28 X |
| 2,310,871 | 2/1943 | Robertson | 73/28 |
| 3,260,104 | 7/1966 | King | 73/23 |
| 3,458,974 | 8/1969 | Orr | 73/28 X |

Primary Examiner—James J. Gill
Assistant Examiner—C. E. Snee, III
Attorney—Martha L. Ross

[57] ABSTRACT

The sensing apparatus of the present invention combines the impaction action of a decelerated small air jet with a quartz crystal microbalance to detect, by mass sensing, the presence of micron size air-borne particulate matter. A quartz crystal, coated with a tacky material and oscillating in a shear mode as part of a resonant circuit, responds to very small changes of mass on its surface by changes in the resonant frequency. This frequency is mixed with that of a reference oscillator and the differential frequency, which is proportional to collected mass, may be counted or converted to an analog signal suitable for direct recording or display, or for the performing of control functions.

12 Claims, 2 Drawing Figures

PATENTED FEB 13 1973

3,715,911

INVENTOR
RAYMOND L. CHUAN

BY  Martha L. Ross
AGENT

APPARATUS FOR SENSING AIR-BORNE PARTICULATE MATTER

BACKGROUND OF THE INVENTION

The present invention relates to apparatus for sensing air-borne particulate matter and, more particularly, to such apparatus which collects and measures the mass of air-borne particulate matter.

Pollution of the atmosphere near earth and in deep space by various undesirable and toxic contaminants, such as noxious gases, radioactive material and the like, has increased the necessity of providing devices for determining the concentration of particles of contamination and the particle size distribution of such contaminants in the atmosphere. Various systems have been devised for collecting a sample of air containing particulate material or debris from a particular atmospheric region, so that this sample might be subsequently analyzed in order to determine the presence and amount of certain constituents.

One type of sampling system presently used includes an inflatable envelope or bag adapted to be attached to an inflatable balloon. As the balloon ascends into the atmosphere and attains a predetermined altitude, ambient air is collected within the bag through an opening or mouth therein. The contents of the bag are thereafter analyzed to determine the material collected therein. The use of this type of particulate collection system is somewhat limited because collection of the sample is best made during ascent of the balloon, when there is a satisfactory flow rate. Such a flow rate is difficult to attain while the balloon is floating in the atmosphere at a substantially constant altitude.

Another type of sampling system is one which collects the particulate material by impaction on a plate or slide, or by filtration in a filter, as the air and the sampler move with respect to each other at relatively high speeds. The material collected on the plate, slide, or filter is subsequently analyzed. Up to the present time, such sampling systems have generally required complex data conversion and time-consuming analysis for a determination of the amount and size of contaminating particles present in the sampled atmosphere.

SUMMARY OF THE INVENTION

In contrast to the prior art sampling systems, the sampling apparatus of the present invention is lightweight, compact, and simple in construction, and measures directly and in real time the mass of air-borne particulate matter. The present apparatus is, in effect, an active impactor in which the impactor surface not only captures particles but also measures the mass of such captured particles.

This is accomplished by combining the impaction action of a decelerated small air jet with a quartz crystal microbalance to detect, by mass sensing, the presence of micron-size air-borne particulate matter. The quartz crystal is coated with a tacky or adhesive material and oscillates in a shear mode as part of a resonant circuit. The tacky layer on the crystal retains impacted particles, and such particles cause a decrease in the resonant frequency of the crystal. This frequency is mixed with that of a reference oscillator and the differential frequency, which is proportional to collected mass, is indicated or recorded.

DESCRIPTION OF THE PREFERRED EMBODIMENT

Figure 1:
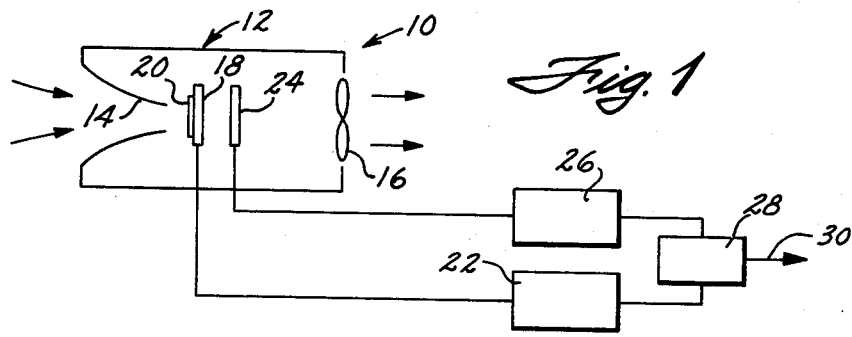
FIG. 1 is a schematic view of an apparatus for sensing and measuring the mass of air-borne particulate matter, constructed in accordance with the principles of the present invention.

As shown in FIG. 1, the sensing apparatus 10 of the present invention generally comprises a housing 12 having an inlet nozzle 14 and having a fan 16 for drawing air from the surrounding atmosphere into the inlet nozzle 14. Air entering the inlet nozzle 14 is impacted upon the adjacent surface of a sensing crystal 18 which is provided with a tacky coating 20 on the surface thereof facing the nozzle 14. The sensing crystal 18 is connected to a sensing oscillator circuit 22 which is well known in the art. An example of such a circuit is disclosed in U.S. Pat. Nos. 3,164,004 and 3,260,104. The crystal 18 is caused to oscillate in a shear mode whereby the opposite faces thereof execute parallel displacements. In this oscillation mode, the frequency of oscillation is affected by the mass on the crystal surface.

A sealed reference crystal 24 preferably matched to the sensing crystal 18, is also located within the housing 12 and is connected to an oscillating circuit 26 of any suitable type which serves to effect oscillation of the reference crystal 24. The sensing oscillation circuit 22 and the reference oscillation circuit 26 are both connected to a conventional mixing circuit 28 which matches the signals from the oscillator circuits 22 and 26 and transmits an output frequency difference signal 30 to a display, recording or control device (not shown).

In the general operation of the sensing apparatus 10, the sensing crystal 18 and the sealed reference crystal 24 are caused to oscillate within the housing 10 by the oscillating circuits 22 and 26, respectively. The crystals 18 and 24 are caused to vibrate either at the same frequency or at a predetermined difference in frequency. When the fan 16 is operated to draw air from the surrounding atmosphere into the inlet nozzle 14, particulate matter in the incoming air sample impacts upon the crystal 18 and causes a decrease in the resonant frequency thereof. This frequency change is sensed by the oscillator circuit 22 and results in a change in the output signal 30 from the mixing circuit 28 where the outputs of the reference oscillating circuit 26 and the sensing oscillating circuit 22 are compared. This change in the output signal 30 serves to indicate on a suitable display or recording device the mass of particulate matter on the tacky coating of crystal 18.

For a crystal operating in a shear mode, whereby the opposite faces execute parallel displacements, the resonant frequency is inversely proportional to mass in cases of small amplitudes of oscillation and small variations in mass. Thus, $$\Delta f = -C f^2 \Delta m$$

where $\Delta f$ is the change in frequency caused by a mass change $\Delta m$, and $C$ is a constant which has the nominal value of $2 \times 10^{-6}$, with $f$ expressed in Hertz and $m$ in grams.

From the foregoing description, it will be apparent that in increase in mass on the sensing crystal 18 will be indicated by an increase in the frequency of the output signal 30 from the mixing circuit 28 which represents the difference in oscillation between the sensing crystal 18 and the reference crystal 24.

An average frequency change rate of the output signal 30 over a predetermined time period may be used to yield the mass concentration on the sensing crystal 18. If the output frequency 30 is converted to a voltage analog, changes may be readily displayed on a meter or may be recorded. The voltage analog of the output frequency may be differentiated to yield a rate of change of frequency and, therefore, of mass. If M is the mass concentration of particulates (above a size which can be impacted) in the air sample which flows into the inlet nozzle 14, at a volume rate of V, the resultant rate of mass addition on the sensing crystal 18 is $\dot{m} = MV \sim f_b$. Since V is known, the particulate mass concentration M is then directly proportional to the rate of output frequency change. An instantaneous frequency change (a step function), on the other hand, yields a pulse (a delta function) through differentiation. Thus, the impaction of a discrete particle on the sensing crystal 18 can also be detected and the mass of the particle measured through the height of the pulse.

It will be readily seen, therefore, that the following three types of information with respect to air-borne particulate matter can be obtained through the use of the apparatus 10 of the present invention:

1. The total mass of particulate matter accumulated over a sampling period;
2. The average particulate mass concentration (averaged over a predetermined interval); and
3. The mass of discrete particulate matter and thus the mass distribution of particulates.

The sensing crystal 18 and reference crystal 24 preferably are matched crystals and are formed of quartz. These crystals, however, may be formed of any other suitable piezoelectric material within the scope of this invention. The reference crystal 24 is sealed in any suitable manner so as not to be exposed to the particulate matter in the air sample entering the inlet nozzle 14, and preferably is subject to the same thermal environment as the sensing crystal 18 so that any changes in temperature which may affect the oscillation of the crystals is compensated for by measuring the difference in oscillation frequency between the crystals 18 and 24.

The tacky or adhesive coating 20 on the sensing crystal 18 preferably is very thin and is formed of a material having a low vapor pressure, good wetting affinity for the crystal surface, and sufficient cohesion or high viscosity not to flow appreciably and spread out under the force of the air sample flowing through the inlet nozzle 14. The coating 20 also should not damp out oscillation of the sensing crystal 18, and should be stable under the environmental temperatures of use. An example of such a material is sulfated ricinoleic acid, which is applied in solution in a volatile solvent, such as isopropanol, to the crystal surface to form a layer which, after evaporation of the solvent, is sufficiently thick to capture particulate matter by adhesion, yet not so thick as to damp out the crystal oscillation. A thickness of up to several microns is generally adequate for this purpose. Preferably, the concentration of the material in solution is sufficiently high so that the resulting coating has sufficient cohesion not to flow and spread under the dynamic pressure of an impinging air jet within a predetermined speed range, which may vary from a very low speed in low altitude sensors to very high speed, such as the speed of sound, in high altitude sensors. Obviously, other materials may be used for the tacky coating 20 on the sensing crystal 18 without departing from the scope of this invention. The coating may be a solid or a viscous liquid in nature. Preferably the coating acts to retain the particulate matter primarily by adhesion and is chemically inert.

As an illustrative example, the sensing crystal 18 and the reference crystal 24 may be matched 10Mhz quartz crystals that are about 1 cm. in diameter and about 0.015 cm. in thickness. The tacky, highly viscous coating 20 on the sensing crystal 18 is a sulfated ricinoleic acid, and is of a thickness of about 1 micron and a mass of approximately $10^{-4}$ gm. The coating 20 is distributed uniformly over the central portion of the crystal surface and covers a generally circular area which is about 3 mm. in diameter. The incoming air jet through the nozzle 14 is approximately 0.2 cm. in diameter, and the flow rate is from about 50 to about 500 $cm^3\ sec^{-1}$. In this particular form of the present sensing apparatus, it is possible to measure the mass concentration of particulate matter down to about 0.5 micron (with mass density of 2 $gm\ cm^{-3}$), and a distribution of particulate mass down to about $10^{-11}$ gm. (per particle). It is obvious that changes may be made in the size and thickness of the crystals, the size and thickness of the tacky coating, and the size and flow rate of the incoming air jet without departing from the scope of this invention.

Referring now specifically to FIG. 2, a preferred embodiment of the sensing apparatus 10 of the present invention is shown in greater detail than the schematic form shown in FIG. 1. The apparatus 10 comprises an outer housing 12 in which an inner housing 32 is rotatably mounted. A motor 34 is operatively connected to the inner housing 32 and serves to rotate it within the outer housing 12 between positions that are controlled by one or more limit switches 36 or any other suitable stop means. The sensing crystal 18 and the sealed reference crystal 24 are both disposed in spaced relation within the inner rotatable housing 32, and are mounted on a sub-housing 38 which includes a circuit board (not shown) comprising the sensing oscillation circuit 22, the reference oscillation circuit 26 and the mixing circuit 28 shown schematically in FIG. 1 and hereinbefore described. The output wires 40 from the mixing circuit are adapted to be connected in any suitable manner to a display, recording or control device (not shown).

The inner housing 32 is provided with an inlet opening 42 in which an inlet orifice disc or nozzle 44 is mounted. The inner housing 32 also is provided with an outlet opening 46 that preferably is opposite to the inlet opening 42.

The outer housing 12 is provided with inlet and outlet openings 48 and 50 in which a collector plate 52 and a fan 54, respectively, are mounted. The fan 54 is connected to a suitable driving means such as a motor 56 mounted within an exhaust duct 58 that is mounted on and extends downwardly from the outer housing 12. An inlet block 60 is mounted on the upper portion of the outer housing 12 and has an inlet orifice disc or nozzle 62 mounted therein. A thermal baffle assembly 64 is mounted on the upper portion of and adapted to communicate with the inlet block 60.

Figure 2:
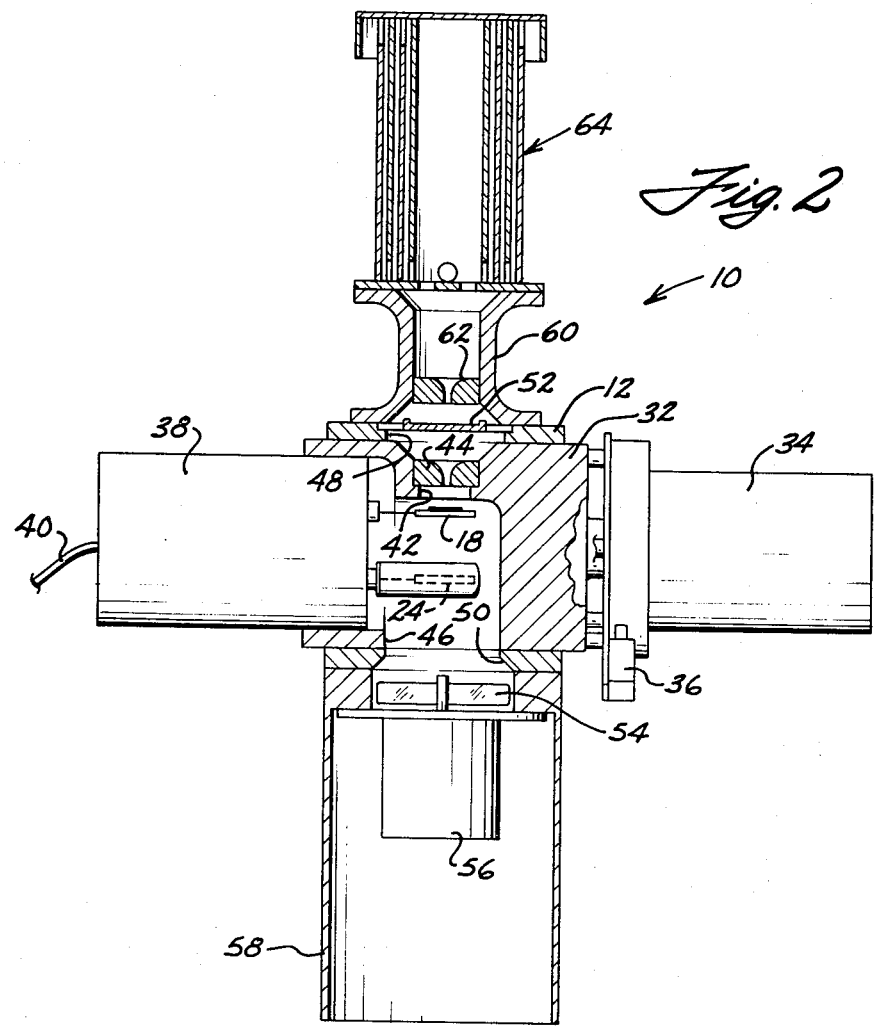
FIG. 2 is a side elevational view, partly in section, of a preferred embodiment of the apparatus of the present invention.

In operation, the inner housing 32 is rotated within the outer housing 12 by the motor 34, to the operative position shown in FIG. 2, wherein the inlet opening 42 and nozzle 44 are in alignment with the collector plate 52 and the nozzle 62 within the inlet block 60. In this operative position, the outlet opening 46 in the inner housing 32 is disposed in alignment with the outlet opening 50 in the outer housing 12 and the fan 54. When the fan is operated by the motor 56 to draw an air sample into the baffle assembly 64, the air to be sampled passes through a plurality of discs in the baffle assembly having by-pass ports at alternate ends thereof. As the air flows within the baffle, the temperature is adjusted to the ambient temperature of the sensing apparatus 10.

The air is then drawn into the inlet block 60 and through the outer nozzle 62, resulting in an increased velocity as it impinges on the collector plate 52 which serves to collect particles of relatively large magnitude, and to allow smaller particles to by-pass to the inner nozzle 44. The air having the smaller particles then enters the inner nozzle 44 and is accelerated to a greater velocity to cause the particles of desired magnitude to impinge on the surface of the sensing crystal 18 having the tacky coating thereon. The air is then drawn by the fan 54 through the openings 46, 50 and into the exhaust duct 58.

When the sensing apparatus 10 is not being utilized, the inner housing 32 is rotated by the motor 34 to an inoperative position (not shown) wherein the openings 42 and 46 in the inner housing 32 are out of communication with and sealed from the openings 48 and 50, respectively in the outer housing 12 by suitable sealing means (not shown) between the housings 12 and 32. In the inoperative position of the inner housing 32, therefore, the sensing crystal 18 is sealed from the outer atmosphere and is protected from contamination until the inner housing 32 is again rotated to the operative position shown in FIG. 2.

The sensing apparatus 10 shown in FIG. 2 is lightweight and simple in construction, and can be easily fabricated and mounted within any suitable vehicle, such as a rocket, for high altitude sampling. The electrical power required for the operation of the inner housing motor 34, the fan motor 56 and the crystal circuits can be provided by any suitable means such as a battery (not shown).

In addition to atmosphere sampling at high altitudes, the sensing apparatus of the present invention may be utilized as an alarm and control unit to monitor debris in spacecraft cabins, as well as for the detection and control of air pollution at low altitudes.

I claim:

1. Apparatus for sensing and measuring the mass of particulate matter in an atmosphere, comprising:
   a housing having an inlet,
   means for drawing an atmospheric sample into said housing through said inlet,
   nozzle means mounted within said housing for accelerating an atmospheric sample entering said inlet,
   a sensing crystal mounted within said housing and having a surface positioned adjacent said nozzle means on which the accelerated atmospheric sample is impinged,
   a tacky coating of sulfated ricinoleic acid on said sensing crystal surface to retain by adhesion predetermined particulate matter in the atmospheric sample impinged thereon,
   means for oscillating said sensing crystal in a shear mode such that the resonant frequency thereof is substantially inversely proportional to the mass thereof,
   a sealed reference crystal mounted within said housing in spaced relation to said sensing crystal,
   means for oscillating said reference crystal at a predetermined frequency, and
   means for detecting and comparing the frequencies of oscillation of said sensing crystal and said reference crystal and for providing an output frequency which is a measure of the frequency difference between said sensing and reference crystals and thereby a measure of the mass of particulate matter retained on said sensing crystal surface.

2. The apparatus of claim 1 wherein said sensing crystal and said reference crystal are matched quartz crystals.

3. The apparatus of claim 1 wherein said oscillating means and said detecting and comparing means comprise a sensing oscillator circuit, a reference oscillator circuit and a mixer circuit.

4. Apparatus for sensing and measuring the mass of particulate matter in an atmosphere, comprising:
   a housing having an inlet,
   means for drawing an atmospheric sample into said housing through said inlet,
   nozzle means mounted within said housing for accelerating an atmospheric sample entering said inlet,
   a sensing crystal mounted within said housing and having a surface positioned adjacent said nozzle means on which the accelerated atmospheric sample is impinged, said sensing crystal being approximately 1 cm. in diameter and approximately 0.015 cms. in thickness,
   a tacky coating on said sensing crystal surface to retain by adhesion predetermined particulate matter in the atmospheric sample impinged thereon, said tacky coating being approximately $10^{-4}$ gm. in mass, approximately 3 mm. in a diameter and approximately 1 micron in thickness,
   means for oscillating said sensing crystal in a shear mode such that the resonant frequency thereof is substantially inversely proportional to the mass thereof,
   a sealed reference crystal mounted within said housing in spaced relation to said sensing crystal,
   means for oscillating said reference crystal at a predetermined frequency, and means for detecting and comparing the frequencies of oscillation of sensing crystal and said reference crystal and for providing an output frequency which is a measure of the frequency difference between said sensing and reference crystals and thereby a measure of the mass of particulate matter retained on said sensing crystal surface.

5. The apparatus of claim 4 wherein the atmospheric sample flow rate through said inlet nozzle is approximately 50 to 500 cm$^3$ sec$^{-1}$.

6. Apparatus for collecting particulate matter in an atmosphere, comprising:

an outer housing having inlet and outlet openings, an inner housing movably mounted within said outer housing and having inlet and outlet openings adapted to be aligned with said inlet and outlet openings of said outer housing when said inner housing is in a first position and to be disposed out of alignment therewith when said inner housing is in a second position, means in said outlet opening of said outer housing for drawing an atmospheric sample into said inlet openings of said inner and outer housings when said inner housing is in said first position, nozzle means in said inlet opening of said inner housing for accelerating an atmospheric sample entering said last mentioned inlet opening, a sensing crystal mounted within said inner housing having a surface positioned adjacent said nozzle means on which the accelerated atmospheric sample is impinged, a tacky coating on said sensing crystal surface adapted to retain by adhesion predetermined particulate matter in the atmospheric sample impinged thereon, means for oscillating said sensing crystal, a sealed reference crystal mounted within said inner housing in spaced relation to said sensing crystal, means for oscillating said reference crystal at a predetermined frequency, means for detecting and comparing the frequencies of oscillation of said sensing crystal and said reference crystal, and for providing an output frequency which is a measure of the frequency difference between said sensing and reference crystals, and means for moving said inner housing between said first and second positions.

7. The apparatus of claim 6 wherein said tacky coating is chemically inert.

8. The apparatus of claim 6 wherein said tacky coating has a low vapor pressure.

9. The apparatus of claim 6 wherein a collector means is mounted within the inlet opening of said outer housing to collect particulate matter above a predetermined size and prevent it from entering said inner housing.

10. The apparatus of claim 9 wherein an inlet block is mounted on said outer housing in communication with said inlet opening thereof, and nozzle means is mounted within said inlet block for accelerating an atmospheric sample entering said block prior to passage through said collector means.

11. The apparatus of claim 10 wherein a thermal baffle assembly is mounted on said inlet block for adjusting the temperature of the atmospheric sample to a predetermined temperature; and for smoothing out small fluctuations in temperature.

12. The apparatus of claim 6 wherein said inner housing is rotatably mounted within said outer housing, and said moving means rotates said inner housing between said first and second positions.

* * * * *